Jan. 15, 1963 H. DEUSSNER 3,073,576
PNEUMATIC MIXER FOR PULVERULENT OR FINE-GRANULAR MATERIAL
Filed May 13, 1960 5 Sheets-Sheet 1

INVENTOR
HERBERT DEUSSNER

Jan. 15, 1963 H. DEUSSNER 3,073,576
PNEUMATIC MIXER FOR PULVERULENT OR FINE-GRANULAR MATERIAL
Filed May 13, 1960
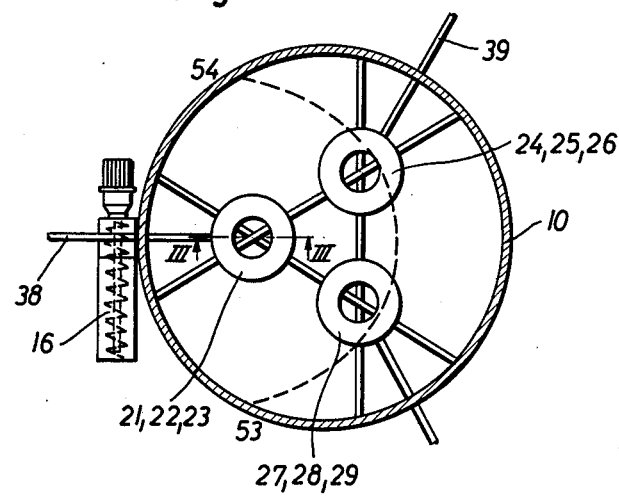
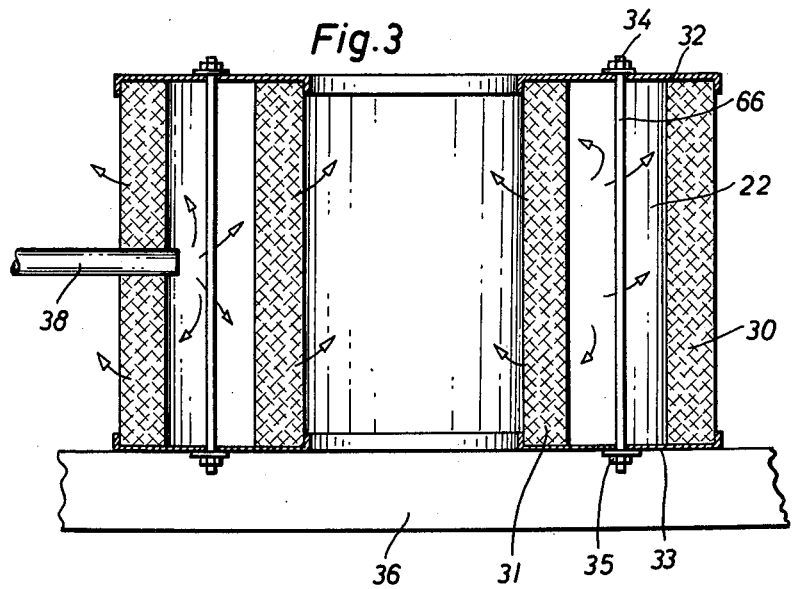
INVENTOR
HERBERT DEUSSNER

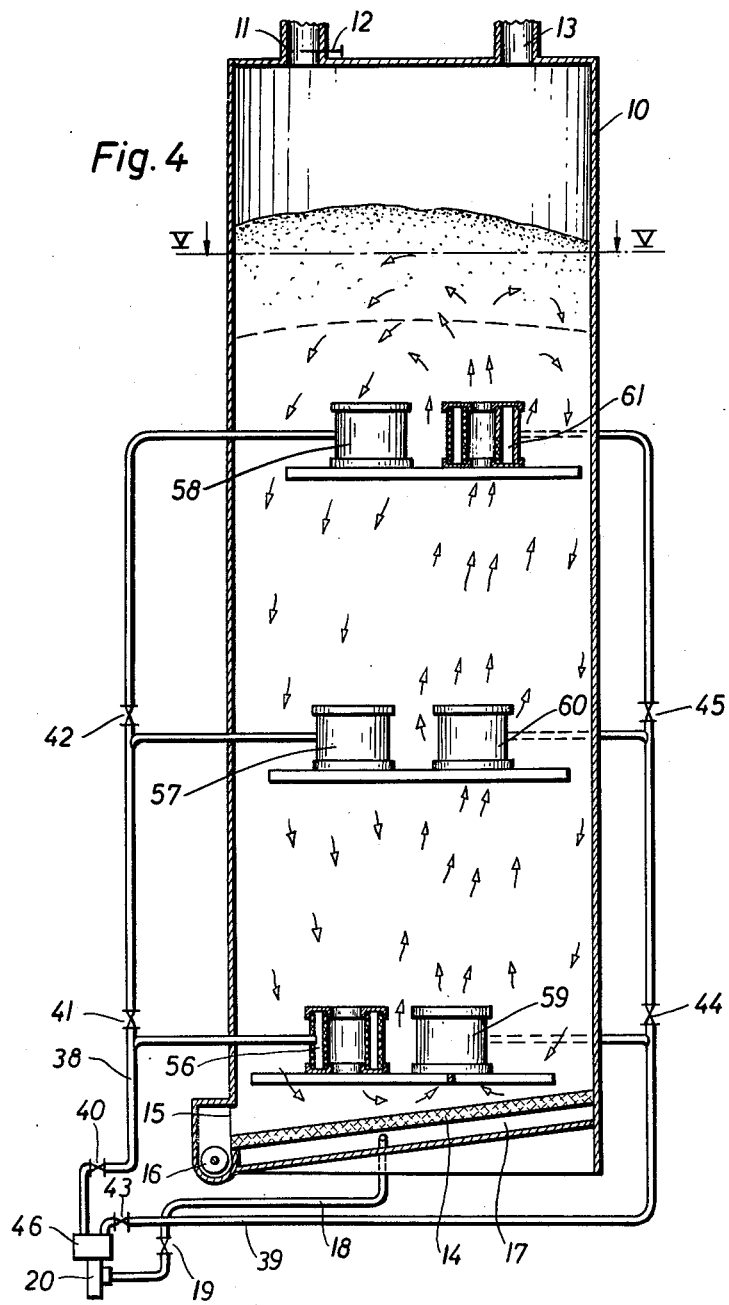

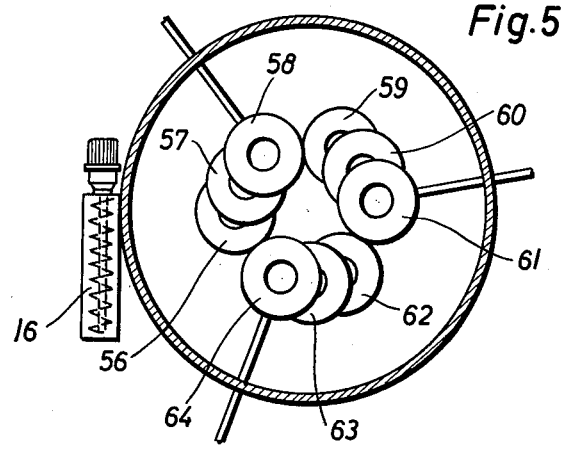
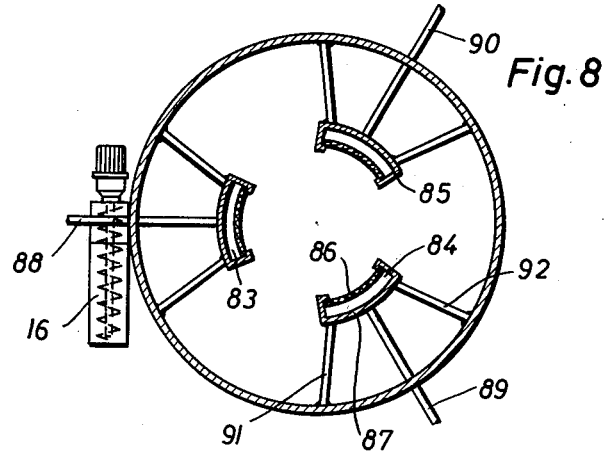

Jan. 15, 1963 H. DEUSSNER 3,073,576
PNEUMATIC MIXER FOR PULVERULENT OR FINE-GRANULAR MATERIAL
Filed May 13, 1960 5 Sheets-Sheet 5
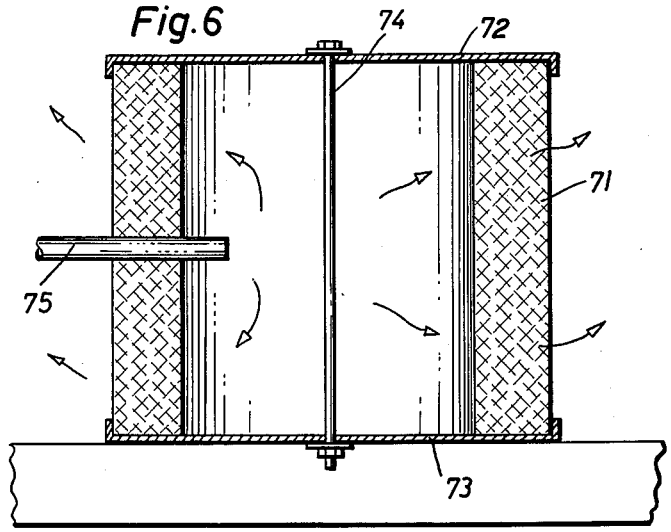
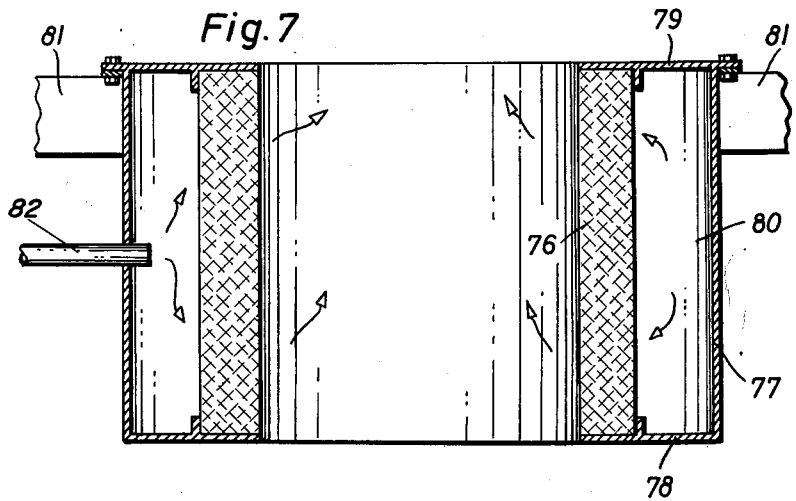
INVENTOR
HERBERT DEUSSNER

United States Patent Office 3,073,576
Patented Jan. 15, 1963

3,073,576
PNEUMATIC MIXER FOR PULVERULENT OR
FINE-GRANULAR MATERIAL
Herbert Deussner, Koln-Dellbruck, Germany, assignor to Klockner-Humboldt-Deutz Aktiengesellschaft, Koln-Deutz, Germany, a corporation of Germany
Filed May 13, 1960, Ser. No. 29,001
Claims priority, application Germany May 16, 1959
9 Claims. (Cl. 259—4)

My invention relates to a pneumatic mixer for pulverulent or fine-granular material, particularly for cement raw material or calcined cement.

A known pneumatic mixer comprises a container with a porous bottom. Located beneath the bottom is a plenum chamber to be supplied with air under pressure. The container has a number of outlet pipes distributed over its periphery and located at different respective heights. The outlet pipes are curved downwardly and have their bottom closed by respective plates of porous material. Located beneath each of these plates is a chamber for connection to the supply of compressed air. Mounted concentrically within each outlet pipe is a riser pipe which terminates at a slight distance above the porous plate. Also mounted concentrically in the outlet pipe is an air-pressure pipe which passes from below through the porous plate and which terminates beneath the riser pipe. The end of the riser pipe is widened to trumpet shape. The riser pipe passes through the wall of the elbow at which the outlet pipe curves toward the container, and opens into the upper portion of the container.

The material to be mixed, fed into the mixing container, is fluidized by a gentle current of air entering through the container bottom. The fluidized material is carried through openings in the container wall into the outlet pipes and then passes onto the porous plates. Compressed air in finely distributed condition is blown through these porous plates. The air current, guided by the trumpet-shaped inlet opening of the riser pipes, passes upwardly through the riser pipes and entrains the particles of material which then again enter into the upper portion of the mixing container. As a result, the material is circulated and mixed.

In another known device, the riser pipes are located inside of the mixing container, the container bottom being likewise porous and supplied with air under pressure. The lower ends of the riser pipes are located at respectively different heights and are curved toward the side and widened to trumpet shape. Air pipes pass into the elbows of the riser pipes and terminate in a narrowed, nozzle type portion of the riser pipes. In this device the material to be mixed is inducted at different heights into the trumpet-shaped inlet openings of the riser pipes and is conveyed by the riser pipes to above the level of the material in the container, thus securing the desired mixing.

The known devices have various disadvantages. The extension system of pipes is subjected to great wear. The nozzles of the air lines tend to become clogged with material. This impairs the efficiency of the known devices in which a great quantity of air under pressure is required for reliably driving the material through the pipes.

Also known is a mixing container whose bottom is provided with a number of connections for the supply of compressed air. Each connection is closed within the container by a distributor head. The connections are arranged in ring-shaped or sector-shaped groups, and each group is connected to its own air-pressure lines. The lines are supplied with compressed air independently of each other and selectively under control by valves or a distributor device. The compressed air passing into the container has the effect of loosening the material and maintaining it agitated. The sectors of the air supply lines are alternately supplied in pairs with compressed air. This has the effect of also providing for some mixing of the material. However, since such slight mixing is not sufficient, the device is provided with one or more propellers for thoroughly moving the material. The propellers are located in the container space filled or traversed by the loosened material to be mixed. The propellers therefore are subjected to a great amount of wear. Furthermore, the propellers require a particular mechanical drive which renders a mixing device of this type excessively expensive.

Another known device for mixing fine granular dry substances comprises a narrow and high container whose top possesses connections for the supply of the material to be mixed, and which is provided above the container bottom with another opening for discharging the material. Mounted on the peripheral container wall at respectively different heights are groups of four nozzles, which are 90° displaced from each other within each group so that there are a total of four vertical nozzle rows. The nozzles located at the same height are connected to one and the same ring-shaped air line. All air lines are connected with a main air supply line under control by respective valve shutters. By blowing compressed air through the nozzles into the container, the material is to become mixed. However, near the container wall and between the vertical nozzle rows there remain zones which are only poorly or not at all aerated by the compressed air. Consequently, no mixing of the material takes place in these zones. In the other zones of the container the mixing is relatively poor because the supply of air takes place symmetrically from the sides so that a rotation of the material in relatively large currents is infeasible.

It is an object of my invention to eliminate the above-mentioned disadvantages of the described known devices.

To this end, and in accordance with a feature of my invention, I provide a pneumatic mixer with a porous container bottom and an air plenum chamber located beneath the bottom and provided with a connection for the supply of air under pressure; and I further mount a plurality of individual chamber structures within the container in several rows and in spaced relation to each other. These chamber structures have porous walls, and the chambers of each individual row are connected to a common air-pressure line. Furthermore each pressure line is provided with a shut-off member for alternately applying and disconnecting the air supply. Such a mixer reliably secures a good mixing of the material exclusively by action of the air currents.

The foregoing and more specific objects, advantages and features of my invention, said features being set forth with particularity in the claims annexed hereto, will be apparent from the following in conjunction with the embodiments of mixers according to the invention illustrated by way of example on the accompanying drawings, in which:

FIG. 2 is a cross section of the same mixer along the line II—II in FIG. 1.

FIG. 3 shows a cross section along the line III—III in FIG. 2.

FIG. 4 illustrates another mixer in longitudinal, vertical section.

FIG. 5 is a cross section along the line V—V in FIG. 4.

FIGS. 6 and 7 are vertical sectional views of two modified chamber structures; and FIG. 8 is a horizontal cross-sectional view of still another modification of a chamber structure.

Figure 1:
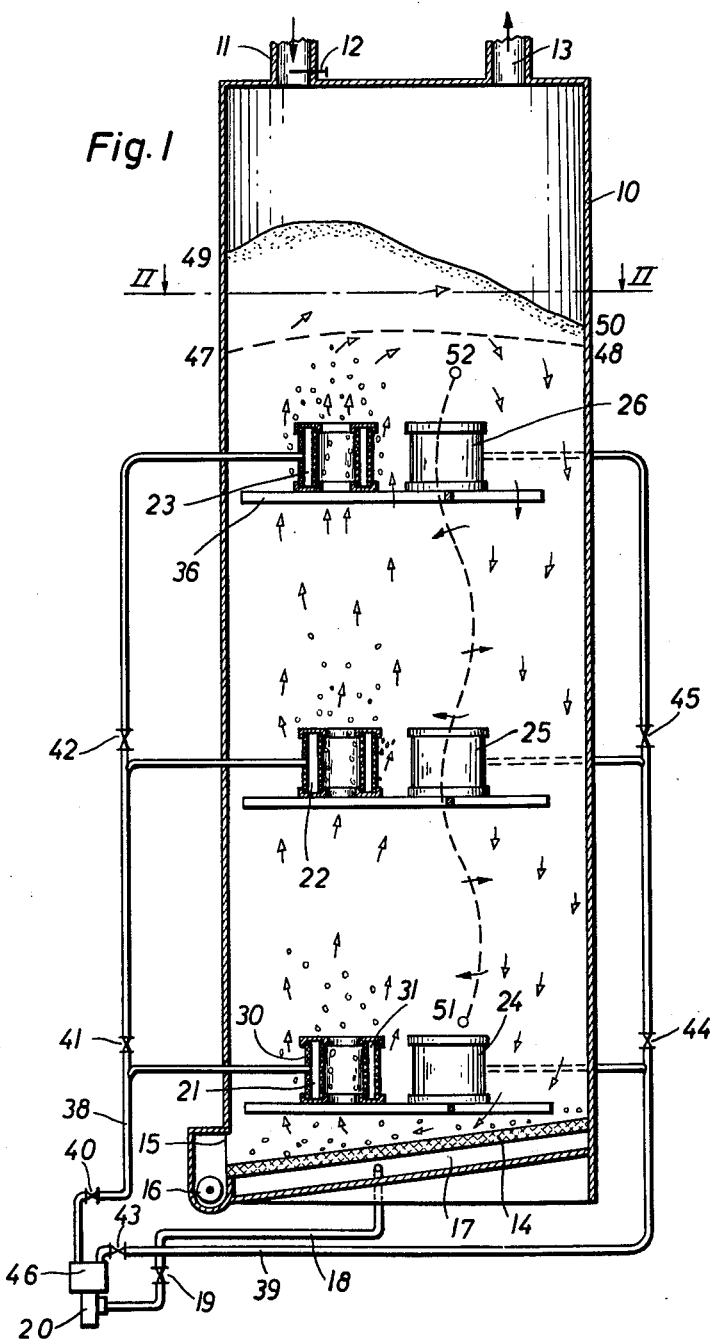
FIG. 1 shows a pneumatic mixer in vertical, longitudinal section.

The mixer illustrated in FIGS. 1 and 2 comprises a cylindrical mixing tank 10 whose top cover has an inlet conduit 11, controllable by a shut-off slider 12, for supplying the material to be mixed. The top of the container is further provided with an air outlet conduit 13. The vertical axial height of the mixing tank is a multiple of its diameter. The bottom of the mixer space in the container is formed by a porous plate 14, for example of ceramic material. An outlet opening 15 for discharging the mixed material is located near laterally and closely above the bottom plate 14, and the plate is inclined downwardly toward the outlet opening 15 to facilitate discharging the fluidized material. Preferably mounted at the outlet opening 15 is a feed screw 16 for conveying the mixed material away from the mixer. The porous bottom plate 14 forms the top of an air plenum chamber 17 communicating with a pipe line 18 for supply of air under pressure. If desired, the single plenum chamber may be replaced by a multiplicity of individual chambers. The air pressure line 18 is provided with a throttle member 19 and branches off a main air pressure supply line 20. The branch line 18 and the plenum chamber 17 are continuously traversed by air during mixing or discharging operation of the mixing apparatus.

Mounted in the interior of the mixing tank are a number of chamber structures which are arranged in three vertical rows and are vertically spaced from each other within each row. For example, a first row comprises chamber structures 21, 22 and 23. A second row comprises chamber structures 24, 25, 26; and a third row comprises chamber structures 27, 28, 29. The three rows are uniformly distributed about the vertical center axis of the mixing tank and are spaced from each other a distance approximately equal to one-half the radius of tank 10. The best suitable number of chamber rows depends upon the diameter of the mixing tank, and the applicable number of chamber structures in each row depends upon the height of the mixing tank.

The walls 30 and 31 of each chamber structure are designed as cylindrical ring members and consist of porous material, such as ceramic or heavy textile-web material. The chambers are closed at the top and bottom by respective ring-shaped discs 32 and 33. The walls 30, 31 and the ring-shaped covers 32, 33 are held together by a number of uniformly distributed screw bolts 66 (FIG. 3) which pass through openings in the ring-shaped covers and carry fastening units 34, 35 on both ends. The chamber structures are supported on flat iron bars 36 fastened to the tank wall.

Each annular chamber of the structures 24 to 29 communicates with an air pressure line. The air pressure lines appertaining to the chambers of one and the same vertical row are connected to a common branch line. For example, the row of chamber structures 21, 22, 23 is supplied with compressed air through a branch line 38; and the row of chamber structures 24, 25, 26 is similarly supplied with air from a branch line 39. At each point where the branch line 38 branches off toward one of the chamber structures, it is provided with a throttle member 40, 41 or 42. Analogously, the branch line 39 is provided at corresponding locations with throttle members 43, 44, 45. These throttle members, such as adjustable throttle valves, afford a good adaptation and graduation of the aeration relative to the column of material to be mixed that is located above each particular chamber structure. The lower chamber structures, for example those denoted by 21 and 24, require a higher air pressure than the upper chambers 23 and 26.

The branch lines are joined with an automatically operating distributor head 46 connected to the main pressure line 20. The distributor head 46 is so designed that the branch lines are alternately supplied with air under pressure. For this purpose the distributor head 46 may be provided with a distributor valve driven by a motor (not shown) at the desired speed to alternately connect the branch lines, one at a time, with the main pressure line 20.

After filling the tank 10 with the material to be mixed, for example cement-raw material, air is blown into the mixing tank through the bottom plate 14 by applying air pressure to the line 18. This has the effect of loosening the content of the mixing tank and placing the material in fluidized condition.

Then, air is blown through the branch line 38 and is distributed to the chamber structures 21, 22, 23 whence it passes through the porous chamber walls 30, 31 into the mixing space. As a result, the material in the tank is further loosened and additionally fluidized. This has the effect that the material flows upwardly according to the arrows entered in FIG. 1, the air blown into the mixer space being schematically represented by small bubbles. As a consequence of this operation, the level of the material located at 47—48 when the material is in condition of rest, will rise during mixing operation up to the higher level approximately indicated at 49—50. The upward flow of fluidized dust material thus produced at the one vertical row of chamber structures supplied with air pressure at a time, namely at the left row of chamber structures in FIG. 1, causes a downward flow of fluidized material to occur in the other regions of the mixing space. The broken lines 51—52 and 53—54 in FIGS. 1 and 2 respectively, schematically indicate the approximate boundary or transition zone between upward flow and downward flow of material. The boundary line 51—52 is shown to have bulges which are caused by the acceleration of the material at the chamber structures and by the resulting suction effect occurring beneath these chamber structures. Aside from the circulating main flow, there also occur lateral flows which intersect the boundary line 51—52 as is symbolized in FIG. 1 by transverse arrows. Due to these lateral flows, the material from different heights within the mixing tank becomes thoroughly mixed.

After elapse of a given time, for example ten minutes, the distributor head 46 switches the supply of air pressure from main line 20 to another branch line, for example to branch line 39. Now, the above-described operation repeats itself, except that the aeration is now shifted to the vertical row of chamber structures 24, 25, 26. As a result, a thorough mixing of the material charged into the mixing tank is achieved even if the mixing tank has a large diameter.

The mixer illustrated in FIGS. 4 and 5 differs from the one described above with reference to FIGS. 1 to 3 in that the chamber structures 56, 57, 58 forming a single row of vertically spaced units, are arranged on a helical line, the same helical arrangement being applied to the second row of chamber structures 59, 60, 61, as well as to a third row of chamber structures 62, 63, 64. This has the advantage that the upward flow produced in the mixing container by the air escaping through the porous walls of the chamber structure, extends on a helical path thus effecting a more intensive rotation of the material being mixed.

The chamber structure shown in FIG. 6 and applicable in mixers otherwise as described above, has only one cylindrical ring 71 of porous material. The central interior space of the ring is closed at the top and bottom by respective circular discs 72 and 73. A screw bolt 74 extends centrally through the discs for holding the parts 72, 71 and 73 together. The chamber is supplied with compressed air through a line 75. The air subsequently passes through the porous ring 71 into the mixing space proper. In this particular embodiment the air emerges only at the outer periphery of the chamber structure, whereas in the chamber structures according to FIG. 3 the air issues in the interior of the chamber structure as well as on the outer peripheral surface.

The chamber structure according to FIG. 7 is likewise provided with a single porous cylinder 76. This cylinder is surrounded by a non-porous jacket 77 consisting, for example, of sheet steel. The jacket 77 and the cylinder 76 form together an annular interspace 80.

The porous cylinder 76 is fastened to the jacket structure between a ring-shaped foot portion 78 and a ring-shaped top portion 79. The jacket 77 is fastened in the mixer tank by means of several ribs 81. Compressed air is supplied into the annular space 80 by means of a supply line 82. The air then passes through the porous cylinder 76. Consequently the air emerges only along the inner peripheral surface of the chamber structure, in distinction from the embodiment of FIG. 6.

FIG. 8 illustrates an embodiment in which each chamber structure 83, 84, 85 is provided with a porous wall 86 shaped as a cylinder segment. The porous wall faces the center of the tank and is mounted on a similarly shaped flat box 87, for example, of sheet steel. The chambers thus formed are connected to respective air pressure lines 88, 89 and 90 and are secured to the tank wall by flat iron supports 91 and 92. Such chamber structures may also be provided with a porous wall facing the peripheral wall of the mixer tank. Furthermore, particularly in the case of mixing tanks having a very large diameter, the part-cylindrical porous plates may also be replaced by planar plates otherwise arranged and mounted in analogy to FIG. 8.

It will be obvious to those skilled in the art upon a study of this disclosure that my invention permits of a variety of modifications and hence can be given embodiments other than particularly illustrated and described herein, without departing from the essential features of my invention and within the scope of the claims annexed hereto.

I claim:

1. A pneumatic mixer for pulverulent and fine-granular material, such as cement material, comprising a mixing tank having a porous bottom and having an air plenum chamber located beneath and adjacent to said bottom and provided with connecting means for supplying pressure air to said chamber; a plurality of rows of chamber structures mounted in said tank in vertically spaced relation to each other, each of said structures having a porous wall; a plurality of air-pressure branch lines of which each is connected to the chamber structures of one of said rows, each of said branch lines having shut-off means for alternately opening and closing the air supply.

2. A pneumatic mixer for pulverulent material, comprising a mixing tank having a porous bottom and having an air plenum chamber located beneath and adajacent to said bottom and provided with connecting means for continuously supplying air pressure to said plenum chamber during operation of the mixer; a plurality of rows of chamber structures mounted in said tank in vertically spaced relation to each other, each of said structures having a porous wall; a plurality of air-pressure branch lines of which each is connected to the chamber structures of one of said rows; a main air supply line and a distributor disposed between said main line and said branch lines and sequentially connecting said respective branch lines, one at a time, and said main line.

3. In a pneumatic mixer according to claim 1, said chamber structures in each row being mounted in vertical alignment.

4. In a pneumatic mixer according to claim 1, said rows of chamber structures in said mixing tank vertically extending on steep helices.

5. In a pneumatic mixer according to claim 1, said tank having a wall provided with an outlet opening for mixed material, said opening being located above and near said porous bottom, and said porous bottom being inclined toward said opening.

6. In a pneumatic mixer according to claim 1, each of said chamber structures comprising two hollow cylindrical and concentric air-permeable members to constitute said porous wall, said two cylindrical members forming together an annular interspace, said interspace communicating with one of said branch lines, whereby air passes through said concentric members at the outer and inner peripheries of said chamber structure.

7. In a pneumatic mixer according to claim 1, each of said chamber structures comprising a hollow cylinder of air-permeable material to constitute said porous wall, and non-porous cover plates closing the top and bottom openings of said hollow cylinder, the enclosed central space within said cylinder communicating with one of said branch lines, whereby air is issued through said cylinder at its outer peripheral surface.

8. In a pneumatic mixer according to claim 1, each of said chamber structures comprising a box consisting of non-porous sheet metal with the exception of an air-permeable portion to constitute said porous wall, the enclosed box space communicating with one of said branch lines.

9. A pneumatic mixer for pulverulent and fine-granular material, such as cement material, comprising a mixing tank having a porous bottom and having an air plenum chamber located beneath and adjacent to said bottom and provided with connecting means for supplying pressure air to said chamber; said tank having a wall provided with an outlet opening for mixed material, said opening being located above and near said porous bottom, and said porous bottom being inclined toward said opening, a plurality of rows of chamber structures mounted in said tank in vertically spaced relation to each other and extending on vertically steep helices, a plurality of air-pressure branch lines of which each is connected to the chamber structures of one of said rows, each of said branch lines having shut-off means for alternately opening and closing the air supply, each of said chamber structures comprising two hollow cylindrical and concentric air-permeable members to constitute said porous walls, two cylindrical members forming together an annular interspace, said interspace communicating with one of said branch lines, whereby air passes through said concentric members at the outer and inner peripheries of said chamber structure.

References Cited in the file of this patent

UNITED STATES PATENTS

| | | |
|---|---|---|
| 2,171,399 | Hastert | Aug. 29, 1939 |
| 2,292,897 | Nielsen | Aug. 11, 1942 |
| 2,723,838 | Peters | Nov. 15, 1955 |

FOREIGN PATENTS

| | | |
|---|---|---|
| 791,266 | Great Britain | Feb. 26, 1958 |
| 541,541 | Italy | Apr. 4, 1956 |